US008205855B2

(12) United States Patent
Li et al.

(10) Patent No.: US 8,205,855 B2
(45) Date of Patent: Jun. 26, 2012

(54) ELECTRIC CONTROL VALVE

(75) Inventors: Zhenming Li, Beijing (CN); Haiqing Li, Beijing (CN)

(73) Assignee: Bejing HaiLin Auto Control Equipment Co., Ltd., Bejing (CN)

( * ) Notice: Subject to any disclaimer, the term of this patent is extended or adjusted under 35 U.S.C. 154(b) by 504 days.

(21) Appl. No.: 12/539,634

(22) Filed: Aug. 12, 2009

(65) Prior Publication Data

US 2010/0038569 A1 Feb. 18, 2010

(30) Foreign Application Priority Data

Aug. 13, 2008 (CN) ...................... 2008 2 0109916 U
May 4, 2009 (CN) ...................... 2009 2 0149713 U

(51) Int. Cl.
*F16K 31/00* (2006.01)
(52) U.S. Cl. ............ 251/11; 251/65; 251/337; 165/287; 236/101 D
(58) Field of Classification Search ............... 251/11, 251/65, 337; 165/287, 300; 236/12.12, 100, 236/99 J, 101 R, 101 D
See application file for complete search history.

(56) References Cited

U.S. PATENT DOCUMENTS

| | | | | |
|---|---|---|---|---|
| 3,212,751 A | * | 10/1965 | Hassa | 251/65 |
| 4,345,234 A | * | 8/1982 | Reich | 337/336 |
| 4,836,496 A | * | 6/1989 | Abujudom et al. | 251/11 |
| 5,897,055 A | * | 4/1999 | Saur et al. | 337/393 |
| 6,404,321 B1 | * | 6/2002 | Buschatz | 337/393 |
| 6,460,335 B1 | * | 10/2002 | Buschatz | 60/527 |

* cited by examiner

*Primary Examiner* — John Fristoe, Jr.
*Assistant Examiner* — Marina Tietjen
(74) *Attorney, Agent, or Firm* — Fulbright & Jaworski L.L.P.

(57) ABSTRACT

An electric control valve provided in the present invention has a valve gate and a control actuator including a middle seat (10), a setting part (9), a thermal sensitive element (7), a pushing rod (11) and a memory alloy spring (6), wherein, the thermal sensitive element (7) is disposed within the middle seat (10) and fixed by the setting part (9), with both poles on it being connected with control terminals respectively, the thermal sensitive element (7) is surrounded by the memory alloy spring (6) and the pushing rod (11) located under the memory alloy spring from outside. Through applying operating voltage on the thermal sensitive element within the electric control valve and then swiftly transmitting heat to the memory alloy spring, when the temperature of the memory alloy spring reaches to a deforming temperature, the memory alloy spring deforms and expands and thus pushes the pushing rod to move. A core 4 and a piston are then driven to move by magnetic coupling. Therefore, the valve is controlled to be closed off. The electric control valve provided in the present invention has characteristics of low energy consuming and stable operating performance, achieving a sensitive remote control of the electric control valve.

8 Claims, 2 Drawing Sheets

ELECTRIC CONTROL VALVE

RELATED APPLICATIONS

This application claims priority from Chinese Patent Application No. 200820109916.0 filed Aug. 13, 2008 and Chinese Patent Application No. 200920149713.9 filed May 4, 2009, each of which is incorporated by reference in its entirety.

FIELD OF THE INVENTION

The present invention relates to valve control technique field, in particular to an electric control valve.

BACKGROUND

The principle of an existing pilot-operated solenoid valve is as follows. When power is on, a pilot hole is opened by electromagnetic force and the pressure of an upper chamber drops rapidly. Thus, a pressure difference is formed around a closing piece due to a higher pressure at the top and a lower pressure at the bottom. The closing piece is pushed to move upward by fluid pressure and a valve is opened. When power is off, the pilot hole is closed by spring force and an inlet pressure enters into a chamber rapidly through a by-pass hole. Thus, a pressure difference is formed around the valve closing piece due to a higher pressure at the top and a lower pressure at the bottom. The closing piece is pushed to move downward by fluid pressure and the valve is closed. Generally, a ferromagnetic piston core is installed at an upper end of a fluid outlet of the valve. The lower end of the piston core is provided with a rubber ring for sealing, and the upper portion thereof is inserted into a valve cage made from non-magnetic material and presses against a pressure spring within the valve cage. When current is not supplied to a coil, due to an elastic restoring force of the pressure spring within the valve cage, the rubber ring at the lower end of the piston core is tightly pressed on a fluid outlet of the valve, therefore the valve is in a state of being closed off. When the coil is powered to operate, the resulting magnetic force urges the piston core to move upward and thus the rubber ring moves away from the fluid outlet within the valve, the valve is opened. When the coil is powered off, the piston core again closes off the valve under the action of the pressure spring. Drawbacks of this kind of electromagnetic valve include that the coil consumes a large amount of electric energy and causes serious heating and even package burning when it works. Additionally, in this kind of electromagnetic valve, the opening and closing of the valve adopts an instantaneous mechanism, causing interference in the fluid.

SUMMARY OF THE INVENTION

In view of this, the present invention provides an electric control valve with characteristics of lower energy consuming as well as stable and reliable operating performance.

An electric control valve provided in the present invention has a valve gate and a control actuator comprising a middle seat, a setting part, a thermal sensitive element, a pushing rod and a memory spring, wherein, the thermal sensitive element is disposed within the middle seat, with its upper end being fixed by the setting part and both poles on it being respectively connected with control terminals;

the thermal sensitive element is surrounded by the memory spring and the pushing rod from outside, with the pushing rod being located under the memory spring, and the thermal sensitive element is in clearance fit with the memory alloy spring;

the valve gate includes a body, a disengagement preventing sleeve, a restoring spring installed within the disengagement preventing sleeve, a magnetic ring closely contacted with an upper potion of the restoring spring, a piston within the body and a core connected with an upper end of the piston, the core is inserted into a core sleeve on the body, with a magnetic pillar being embedded within an upper portion of the core, and the magnetic ring is closely fitted with the magnetic pillar;

a lower end of the pushing rod extends through a notch of the middle seat and contacts closely with the magnetic ring of the valve gate; and the control actuator further includes a connecting part for connecting the control actuator and the body so as to fix the control actuator on the body.

An electric control valve provided in the present invention has a valve gate and a control actuator including a middle seat (10), a setting part (9), a thermal sensitive element (7), a pushing rod (11) and a memory alloy spring (6), wherein, the thermal sensitive element (7) is disposed within the middle seat (10) and fixed by the setting part (9), with both poles on it being connected with control terminals respectively, the thermal sensitive element (7) is surrounded by the memory alloy spring (6) and the pushing rod (II) located under the memory alloy spring from outside. Through applying operating voltage on the thermal sensitive element within the electric control valve and then swiftly transmitting heat to the memory alloy spring, when the temperature of the memory alloy spring reaches to a deforming temperature, the memory alloy spring deforms and expands and thus pushes the pushing rod to move. A core 4 and a piston are then driven to move by magnetic coupling. Therefore, the valve is controlled to be closed off. The electric control valve provided in the present invention has characteristics of low energy consuming and stable operating performance, achieving a sensitive remote control of the electric control valve.

Figure 1:
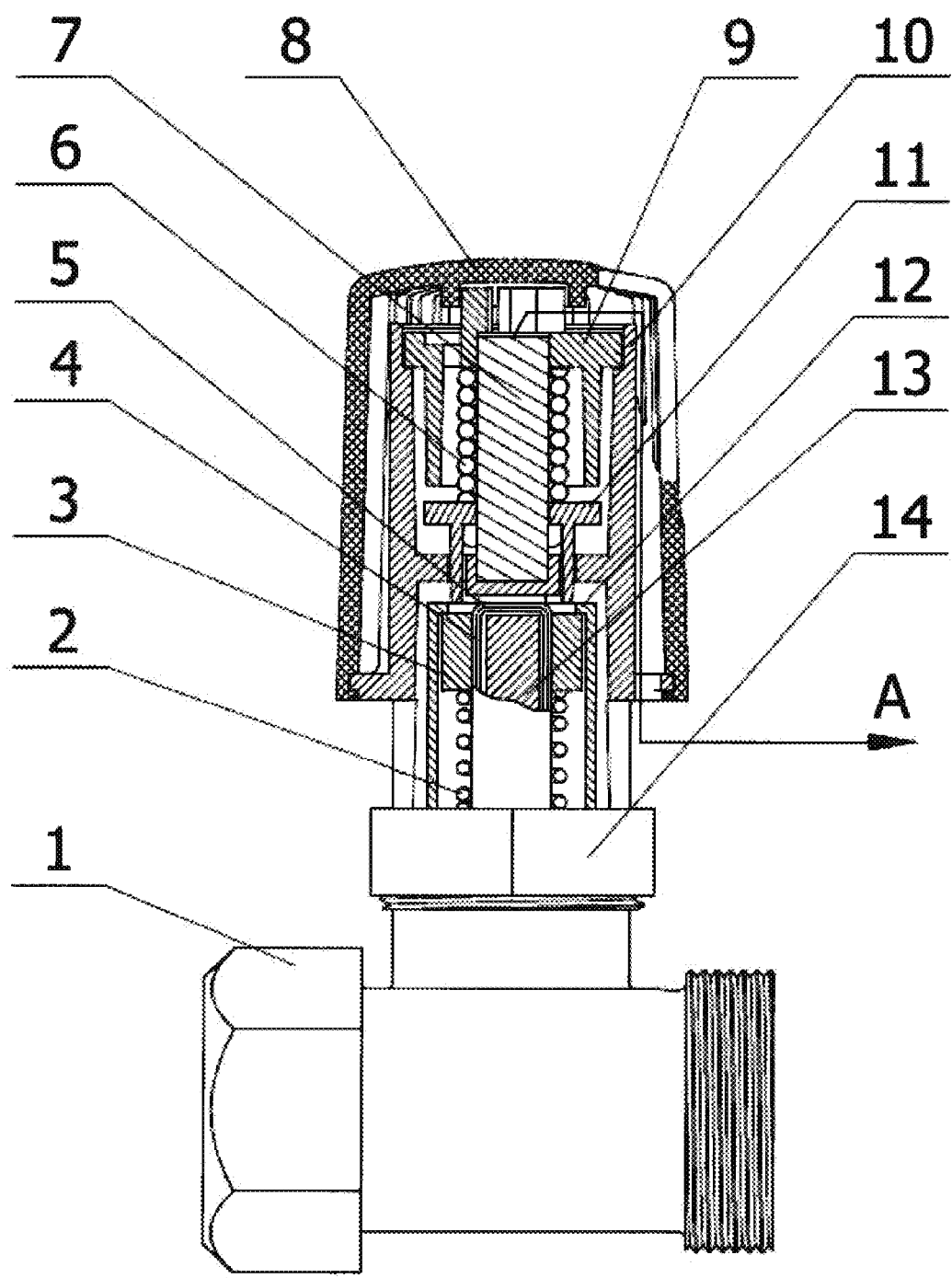
FIG. 1 is a sectional view of an electric control valve provided in an embodiment of the present invention.

REFERENCE NUMBERS 1. valve body
2. restoring spring
3. magnetic ring
4. core
5. core sleeve
6. memory alloy spring
7. thermal sensitive element (PTC thermal sensitive bar)
8. casing
9. setting part (nut)
10. middle seat
11. pushing rod
12. disengagement preventing sleeve
13. magnetic pillar
14. connecting part (nut)

DETAILED DESCRIPTION OF THE INVENTION

In view of the drawbacks and shortcomings of existing electric control valves, the present invention provides an electric control valve with low energy consuming and stable operating performance. The electric control valve has a valve gate, a control actuator comprising a middle seat, a setting part, a thermal sensitive element, a pushing rod and a memory spring, and a connecting part, wherein, the thermal sensitive element is disposed within the middle seat, with its upper end being fixed by the setting part and both poles on it being respectively connected with control terminals;

the thermal sensitive element is surrounded by the memory spring and the pushing rod from outside, with the pushing rod being located under the memory spring, and the thermal sensitive element is in clearance fit with the memory alloy spring; the valve gate includes a body, a disengagement preventing sleeve, a restoring spring installed within the disengagement preventing sleeve, a magnetic ring closely contacted with an upper potion of the restoring spring, a piston within the body and a core connected with an upper end of the piston, the core is inserted into a core sleeve on the body, with a magnetic pillar being embedded within an upper portion of the core, and the magnetic ring is closely fitted with the magnetic pillar, thus a pushing force can be transmitted between them by an action of magnetic force;

a lower end of the pushing rod extends through a notch of the middle seat and contacts closely with the magnetic ring of the valve gate; and the control actuator further includes a connecting part for connecting the control actuator and the body so as to fix the control actuator on the body.

The thermal sensitive element employs a Positive Temperature Coefficient (PTC) thermistor, abbreviated to PTC thermistor. The PTC thermistor is a typical temperature-sensitive semiconductor resistance whose resistance value increases by step as the temperature increases when the temperature is above certain temperature (Curie temperature).

The changing of the temperature of the PTC thermistor itself may be obtained by a current passing through the PTC thermistor or by the heat input from outside, or by the combination of the both. The present invention utilizes the property of the PTC thermal sensitive element and thus may achieve a sensitive remote controlling of the electric control valve.

Next, the operating principle of the present invention will be described in detail in conjunction with examples of embodiments.

The present embodiment takes a temperature control system for heating supply as an example.

The temperature control system consists of an indoor temperature adjuster (a temperature sensor and a controller) and an electric control valve. The temperature adjuster is mounted within a room to be heated and controls respective electric control valves. The electric control valves are mainly located at hot water outlets of a boiler or water inlets of geothermal pipelines. Various electric control valves control the hot water flow of respective heating pipes.

Referring to FIG. 1, an electric control valve consists of a valve gate and an actuator connected via a connecting nut 14, and includes a body 1, a restoring spring 2, a magnetic ring 3, a core 4, a core sleeve 5, a memory spring 6, a PTC thermal sensitive bar 7, a casing 8, a setting nut 9, a middle seat 10, a push rod 11, a disengagement preventing sleeve 12, a magnetic pillar 13 and a connecting nut 14.

The valve gate consists of a body 1, a disengagement preventing sleeve 12, a restoring spring 2 installed within the disengagement preventing sleeve 12, a magnetic ring 3 pressing against the top of the restoring spring 2, a piston within the body 1, and a core 4 connected with an upper end of the piston. The core 4 is inserted into a core sleeve 5 on the body 1, with a magnetic pillar 13 being embedded within an upper portion of the core 4. The body 1 has a water outlet inside it, which cooperates with the piston to control the flow of the valve gate.

The actuator includes a middle seat 10, a setting nut 9, a PTC thermal sensitive bar 7, a pushing rod 11, a casing 8, a connecting nut 14 and a memory spring 6. Both ends of the PTC thermal sensitive bar 7 are respectively fixed by the middle seat 10 and the setting nut 9. The PTC thermal sensitive bar 7 is surrounded by the memory spring 6 and the pushing rod 11 from outside. The push bar 11 is located under the memory alloy spring 6 and has two teeth (or more) at its lower end. The push bar 11 extends through a notch of the middle seat 10, with those teeth respectively abutting against the magnetic ring 3 of the valve gate. The PTC thermal sensitive bar 7 is in clearance fit with the memory alloy spring 6, while both poles on the PTC thermal sensitive bar 7 are connected with the indoor temperature adjuster through leads.

Figure 2:
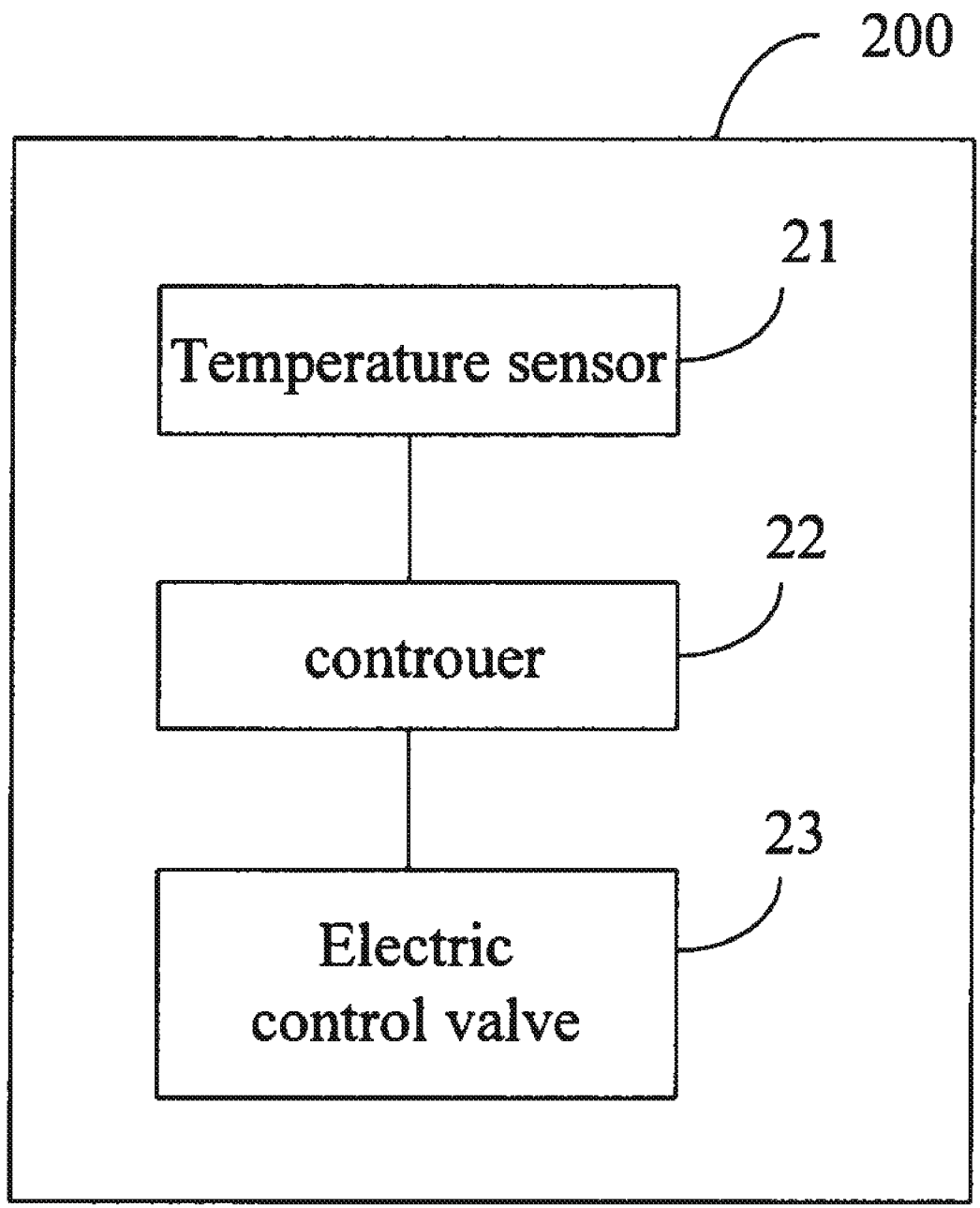
FIG. 2 is a schematic view of a device for heating control provided in an embodiment of the present invention.

Referring to FIG. 2, a device 200 for heating control provided in the present invention includes a temperature sensor 21, a controller 22 and an electric control valve 23;

wherein, the temperature sensor 21 and the controller 22 are connected with each other;

control terminals of the controller 22 are respectively connected with both poles on a thermal sensitive element in the electric control valve 23;

the electric control valve 23 is disposed on a thermal medium transmitting channel for controlling the flow of the thermal medium toward a radiator.

The operating principle of the device 200 for heating control provided in the present invention is as follows.

After a temperature value is set for a temperature controller in a room, when the actual indoor temperature is lower than the set temperature value, on signal is output to the controller 22 by a temperature sensor 21. Therefore, there is on operating voltage between two poles of a PTC thermal sensitive bar 7 within the electric control valve and the PTC thermal sensitive bar 7 does not give out heat. Thus, the memory alloy spring 6 is in its original contracted state. A magnetic ring 3 and a push rod 11 on an upper end of a restoring spring 2 are forced to be at a high position (the position shown in the drawings) by the spring restoring force of the restoring spring 2. The magnetic ring 3 then forces a magnetic pillar 13 in a core 4 within a core sleeve 5 to be at a high position through magnetic coupling interaction. The core 4 in turn pulls a piston at its lower end to move away from a water outlet within the body of the valve, thereby, the valve gate is in an opened state, allowing the thermal medium to flow toward radiating pipes or radiators.

As indoor temperature increases gradually up to an indicated value of the set temperature of the indoor temperature adjuster, the temperature sensor 21 outputs a signal to the controller 22, which applies an operating voltage to the PTC thermal sensitive bar 7 within the electric control valve via leads. The PTC thermal sensitive bar 7 in turn swiftly transmits heat to the memory alloy spring 6. When the temperature of the memory alloy spring 6 reaches a deforming temperature, the memory alloy spring 6 deforms and expands instantly, and thus pushes the pushing rod 11 to move downward, which in turn pushes the magnetic ring 3 to move downward. Then, the magnetic ring 3 pushes the magnetic pillar 13 within the core 4 to move downward through magnetic coupling while compressing the restoring spring 2. The magnetic pillar 13 in turn drives the core 4 and the piston at the lower end to move downward and thus the piston is forced to block the water outlet within the valve. Therefore, the valve is closed off and the thermal medium stops flowing toward radiating pipes or radiators.

When the indoor temperature drops gradually below the set temperature value of the adjuster, power resource is cut off by the adjuster, and the PTC thermal sensitive bar 7 within the electric control valve is then not supplied with current and ceases heat generating. Since the memory alloy spring is formed of a kind of one-way memory alloy whose memory state is the elongation state under high temperature. When the temperature of the memory alloy spring 6 drops below the deforming temperature value, the memory alloy spring 6 softens and returns to the compressed state under the action of the restoring spring. Also, the core 4 drives the piston to move away from the water outlet within the valve under the action of the restoring spring 2. Thus, the thermal medium flows toward radiators or radiating pipes. In this way, the heating system can maintain the indoor temperature within a set temperature range.

In the electric control valve provided in the present invention, through applying an operating voltage to an PTC thermal sensitive bar 7 within the electric control valve and then swiftly transmitting heat to a memory alloy spring 6, the memory alloy spring 6 is made to deform and expand when its temperature reaches a deforming temperature, a push rod 11 is pushed to move and a core 4 and a piston is driven to move through magnetic coupling, and therefore the valve is controlled to be closed off. Since a PTC thermal sensitive element is employed, the electric control valve provided in the present invention has characteristics of low energy consuming and stable operating performance, achieving a sensitive remote control of the electric control valve.

The above descriptions are only preferred embodiments of the present invention, and not used for defining the scope of protection thereof. Any modification, equivalent alternative and improvement made within spirits and principles of the present invention shall be all included in the scope of protection of the present invention.

The invention claimed is:

1. An electric control valve, comprising:
a valve gate comprising a body, a disengagement preventing sleeve, a restoring spring installed within the disengagement preventing sleeve, a magnetic ring contacted with an upper portion of the restoring spring, a piston within the body and a core connected to an upper end of the piston, the core being inserted into a core sleeve on the body, with a magnetic pillar being embedded within an upper portion of the core, and the magnetic ring being fitted with the magnetic pillar; and
a control actuator comprising a middle seat, a setting part, a thermal sensitive element, a pushing rod and a memory spring; and
wherein the thermal sensitive element is disposed within the middle seat, with an upper end of the thermal sensitive element being fixed by the setting part and two poles on the thermal sensitive element being connected to control terminals, respectively;
wherein the thermal sensitive element is surrounded by the memory spring and the pushing rod from outside, with the pushing rod being located under the memory spring, and the thermal sensitive element is in clearance fit with the memory spring;
wherein a lower end of the pushing rod extends through a notch of the middle seat and contacts with the magnetic ring of the valve gate; and
wherein the control actuator further comprises a connecting part for connecting the control actuator and the body of the valve gate so as to fix the control actuator on the body of the valve gate.

2. The electric control valve of claim 1, wherein the thermal sensitive element is a Positive Temperature Coefficient thermal sensitive element, or the setting part is a nut, or the connecting part is a connecting nut.

3. The electric control valve of claim 2 being incorporated into a device for controlling heat, comprising:
a temperature sensor, and
a controller comprising control terminals respectively connected with the two poles on the thermal sensitive element, the controller being connected to the temperature sensor; and
wherein the electric control valve is disposed on a thermal medium transmitting channel for controlling the flow of the thermal medium toward a radiator.

4. The electric control valve of claim 1, wherein the push rod has at least two teeth at its lower end, and the push rod extends through the middle seat and contacts with the magnetic ring of the valve gate through the teeth.

5. The electric control valve of claim 4 being incorporated into a device for controlling heat, comprising:
a temperature sensor, and
a controller comprising control terminals respectively connected with the two poles on the thermal sensitive element, the controller being connected to the temperature sensor; and
wherein the electric control valve is disposed on a thermal medium transmitting channel for controlling the flow of the thermal medium toward a radiator.

6. The electric control valve of claim 1, further comprising a casing for covering the control actuator.

7. The electric control valve of claim 6 being incorporated into a device for controlling heat, comprising:
a temperature sensor, and
a controller comprising control terminals respectively connected with the two poles on the thermal sensitive element, the controller being connected to the temperature sensor; and
wherein the electric control valve is disposed on a thermal medium transmitting channel for controlling the flow of the thermal medium toward a radiator.

8. The electric control valve of claim 1 being incorporated into a device for controlling heat, comprising:
a temperature sensor, and
a controller comprising control terminals respectively connected with the two poles on the thermal sensitive element, the controller being connected to the temperature sensor; and
wherein the electric control valve is disposed on a thermal medium transmitting channel for controlling the flow of the thermal medium toward a radiator.

* * * * *